United States Patent [19]

Mukai et al.

[11] Patent Number: 5,109,966

[45] Date of Patent: May 5, 1992

[54] MATING PLATE IN FRICTION ENGAGEMENT DEVICE

[75] Inventors: Kazuhito Mukai; Takao Shibuya, both of Chitose, Japan

[73] Assignee: Dynax Corporation, Chitoshe, Japan

[21] Appl. No.: 759,111

[22] Filed: Sep. 6, 1991

Related U.S. Application Data

[63] Continuation of Ser. No. 526,225, May 21, 1990, abandoned.

[51] Int. Cl.[5] .................. F16D 13/64; F16D 65/02; F16D 69/00
[52] U.S. Cl. .................. 192/70.12; 192/70.14; 192/107 M; 188/71.5; 188/251 M
[58] Field of Search ............ 192/70.12, 70.14, 107 R, 192/107 M, 113 B; 188/71.5, 71.6, 251 M, 251 A, 264 B, 264 D, 264 E

[56] References Cited

U.S. PATENT DOCUMENTS

| | | | |
|---|---|---|---|
| 2,191,460 | 2/1940 | Fisher | 192/107 M |
| 2,850,118 | 9/1958 | Byers | 192/70.14 X |
| 3,782,953 | 8/1973 | Huet | 192/107 M X |
| 4,290,510 | 9/1981 | Warren | 192/107 M X |
| 4,715,486 | 12/1987 | Burgdorf et al. | 192/107 M |

FOREIGN PATENT DOCUMENTS 588669 5/1947 United Kingdom ........... 192/107 M

OTHER PUBLICATIONS

Mukai, K. et al., "Improvement of Heat Resistance in the Wet Friction System by Chromium Plating Reaction Plates", SAE Technical Paper Series 901654, pp. 1-13, (1990).

*Primary Examiner*—Richard Lorence
*Attorney, Agent, or Firm*—Howson & Howson

[57] ABSTRACT

A mating plate in a friction engagement device comprises a steel core plate provided with a chromium plating whereby kinetic friction coefficient is improved and its change with the passage of time may be suppressed.

6 Claims, 3 Drawing Sheets

FIG. 1
FIG. 2
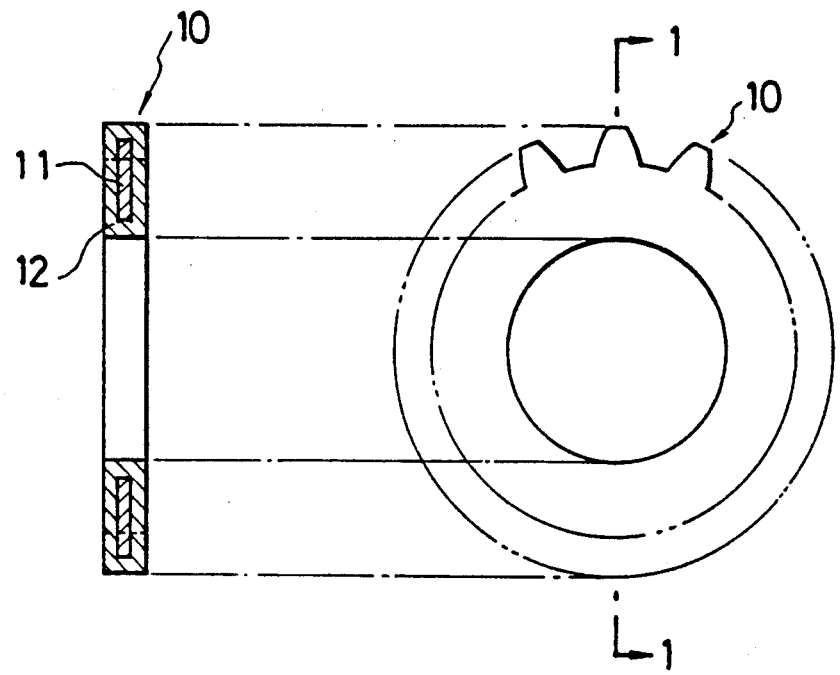
FIG. 3
FIG. 4
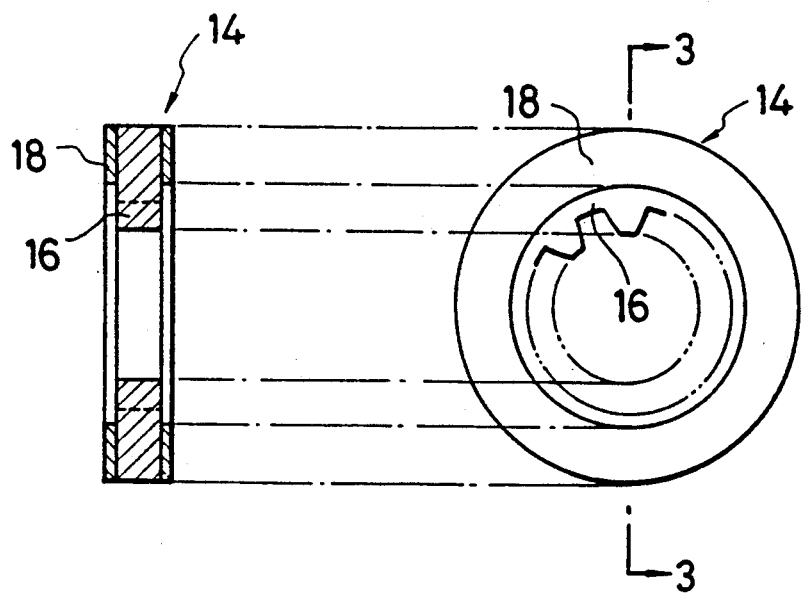

MATING PLATE IN FRICTION ENGAGEMENT DEVICE

This is a continuation of application Ser. No. 526,225, filed on May 21, 1990, now abandoned.

FIELD OF INVENTION

This invention relates to mating plates used in clutches, band brakes and torque converter lock up mechanisms, etc. in friction engagement devices used in, for example, automatic transmissions. Mating plates are those plates used in combination with friction plates to which friction material is bonded, such as, in clutches.

BACKGROUND OF INVENTION

Friction engagement devices comprise friction plates and mating plates adapted to cooperate with each other.

Performance of friction engagement devices principally depends upon the performance of friction plates, especially, that of the friction materials. Conventional mating plates which are formed as simple one-piece plates are, in terms of the mechanical function, merely capable of receiving torque from the friction plates.

Conventional mating plates thus have drawbacks that the so-called "heat spots" are generated as result of the repetition of engagements and disengagements of the friction elements, or deformation due to the heat generated during use, which eventually causes the friction engagement devices to become unsuited for the intended use. Moreover, as result of use, coefficient of friction is likely to remarkably decrease, which requires that the so-called "safety factor" be set relatively high, which in turn requires the friction engagement device to be relatively large-sized as a whole.

In order to cope with these problems, it has been proposed that the mating plates be formed with grooves, or coatings having high heat conductivity. However, these measures merely intend to prolong the useful life of the mating plates on account of the cooling effect of those measures; and therefore, improvements of the fundamental performance of friction engagement devices are not obtainable, such as, the improvements in kinetic friction coefficient $\mu_D$, static friction coefficient $\mu_S$ and the so-called $\mu-\nu$ characteristics (namely, the ratio of kinetic friction coefficient, i.e., $\mu_D$ to friction coefficient when the relative rotation is zero, i.e., $\mu_0$).

The object of the present invention is to provide mating plates capable of improving the abovementioned characteristics, suppressing change of coefficients of friction with the passage of time and preventing deformation due to heat.

SUMMARY OF INVENTION

The present invention has solved the abovementioned problems by the mating plate comprising a steel core plate provided with a chromium plating; and the mating plate comprising a steel core plate provided with a copper plating. "Chromium" plating includes a plating with alloy(s) which include chromium at 50% or more; and "copper" plating includes a plating with alloy(s) which include copper at 50% or more.

According to the mating plate provided with a chromium plating, firstly, the change of coefficient of friction with the passage of time may be suppressed; secondly, owing to the improvement of kinetic friction coefficient, fluctuation of the transmitted torque immediately before and after the time when there is no relative rotation may also be suppressed; and thirdly, deformation of the mating plates due to heat may be prevented.

On the other hand, according to the mating plate provided with a copper plating, static friction coefficient may be improved and the torque capacity per unit area when there is no relative rotation may be increased. Thus, a larger torque may be transmitted if the size is the same.

Thus, the safety factor may be set lower; and the friction engagement devices may be made compact. Also, useful life of the complimentary friction plates may be prolonged.

BRIEF DESCRIPTION OF THE DRAWINGS

FIG. 1 is a section of the mating plate according to the present invention;
FIG. 2 is a front view thereof;
FIG. 3 is a section of a friction plate;
FIG. 4 is a front view thereof.

PREFERRED EMBODIMENTS

Figure 5:
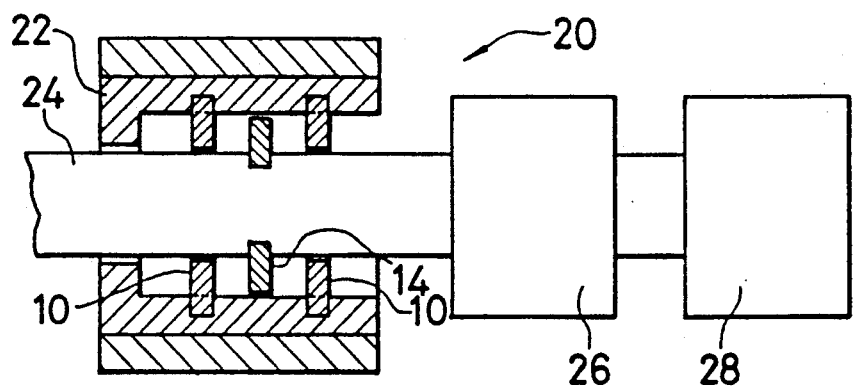
FIG. 5 is a schematic view of SAE No. 2 friction testing machine, a part thereof shown in section.

FIGS. 1 and 2 illustrate a section and a front view of the mating plate 10 according to the present invention, respectively. The thicknesses of the core plate 11 and the chromium plating 12 are exaggerated to help understanding. The core plate 11 is formed of steel as is the case with the prior art.

Chromium plating may be generally effected by electroplating utilizing the so-called "Sargent" bath. However, electroless or dry plating may also be utilized. The thickness of such plating may be in the range of from 0.1 to 1,000 microns; and will be determined according to the conditions of use.

Copper plating may be provided similarly using cyanide bath or copper sulfate bath.

FIGS. 3 and 4 show a friction plate 14 used in combination with the mating plate 10. The friction plate 14 comprises a core plate 16 bonded with friction material 18. As in FIG. 1, the thicknesses of the core plate 16 and the friction material 18 are shown exaggerated.

EXAMPLES

In order to determine the improvements according to the present invention, tests were carried out.

Shown in FIG. 5 is the so-called "SAE No. 2" Friction Testing Machine. The mating plates 10, 10 are spline coupled to the housing 22 and the friction plate 14 is spline coupled to the shaft 24. A motor 28 is coupled to the shaft 24 through inertia 26. The test conditions are as shown in the following Table I:

TABLE I

| | |
|---|---|
| Number of Friction Plate | 1 |
| Number of Mating Plate | 2 |
| Thickness of Friction Plate | 1.6 mm |
| Thickness of Mating Plate | 1.7 mm |
| Oil | Matic D |
| Piston Area | 151.1 cm$^2$ |
| Inertia | 0.0150 kgms$^2$ |
| Method of Operation | Inertia Absorption |

TABLE I-continued

| | |
|---|---|
| Oil Temperature | 120° C. |
| Pressure | 8 kg/cm$^2$ |

Samples were: (a) conventional mating plate comprising a one-piece steel plate; (b) mating plate comprising a steel core plate provided with chromium plating; and (c) a mating plate comprising a steel core plate provided with copper plating.

The chromium plating was effected by the so-called "Wet Electroplating Method"; the bath was Sargent bath; the thickness of the plating was about 1 micron. The copper plating was provided similarly using a copper sulfate bath to obtain about 1 micron thick plating.

Figure 6A:
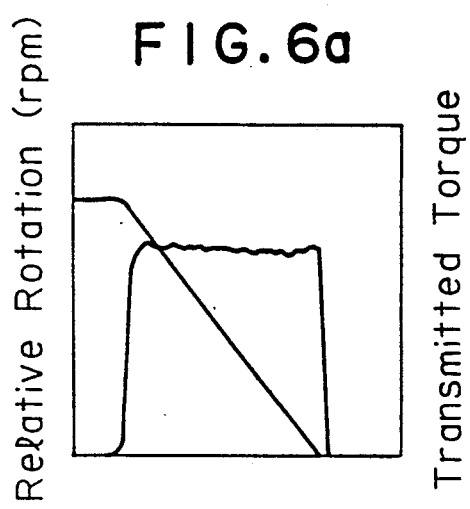
FIGS. 6a to 6c are diagrams showing the interrelationship between the relative rotation of a mating plate and a friction plate, and the transmitted torque.

The relationship between the relative rotation of the mating plate and the friction plate, and the transmitted torque (the so-called "torque waveform") has been obtained. FIG. 6a corresponds to the conventional mating plate, FIG. 6b corresponds to the mating plate with chromium plating and FIG. 6c corresponds to the mating plate with copper plating. Also, as shown in the following Table II, kinetic friction coefficient at the relative rotation of 1,800 rpm ($\mu_{D1800}$), that of when the relative rotation is zero ($\mu_0$), static friction coefficient ($\mu_S$) and the ratio thereof were obtained.

TABLE II

| Mating Plate | Steel plate (a) | Cr plating (b) | Cu plating (c) |
|---|---|---|---|
| $\mu_{D1800}$ | 0.131 | 0.151 | 0.116 |
| $\mu_0$ | 0.129 | 0.125 | 0.150 |
| $\mu_s$ | 0.114 | 0.115 | 0.136 |
| $\mu_0/\mu_{D1800}$ | 0.98 | 0.83 | 1.29 |

Figure 7:
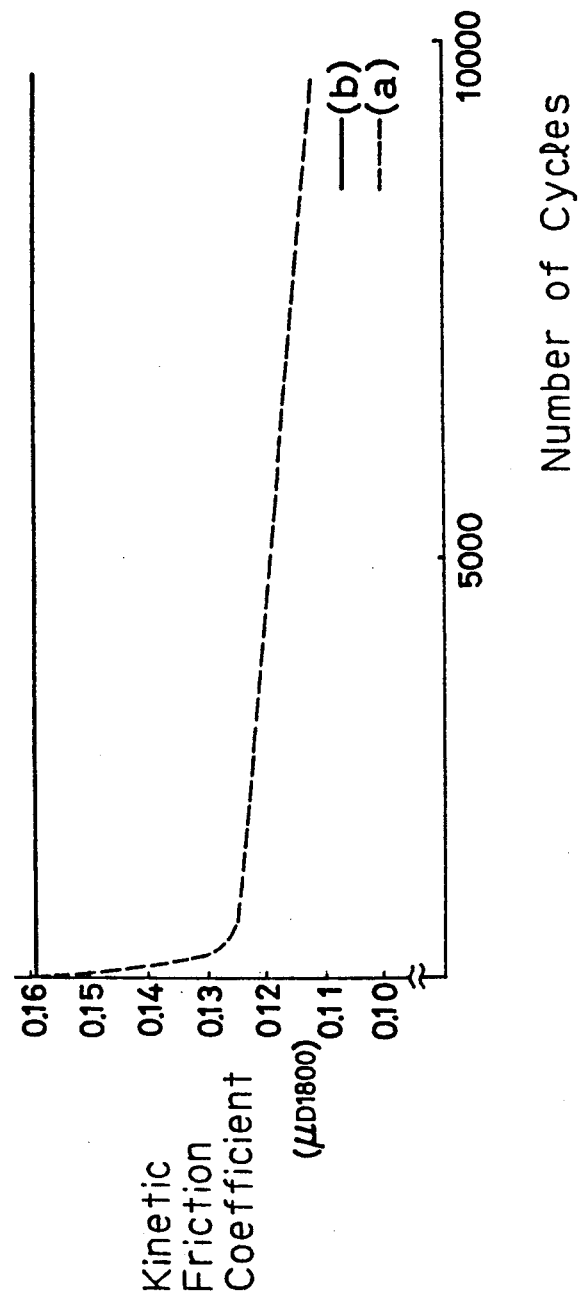
FIG. 7 is a diagram showing the results of the endurance test.

Furthermore, with the same testing equipment, endurance test was conducted with respect to the sample (a) and sample (b). FIG. 7 shows the change of kinetic friction coefficients as result of the test.

Figure 6B:
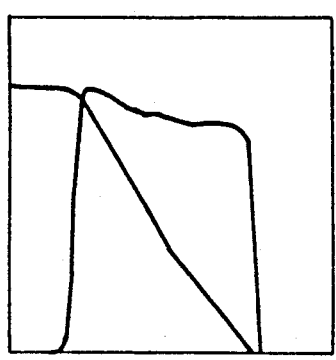

The following results were obtained by way of showing the improvements in the friction characteristics:

As to the mating plate with Cr plating:

(1) As seen from FIG. 6b and Table II, kinetic friction coefficient ($\mu_{D1800}$) was improved by about 10 to 20% compared with the conventional mating plate (a).

Thus, when there exists relative rotation, the torque transmittable with the same pressing force may be increased; thus, the time for completing engagement may be shortened. Consequently, the hydraulic pressure for effecting engagement may be set lower, which will give leeway for the design of the hydraulic mechanism and makes it possible to make the friction engagement devices compact.

As the kinetic friction coefficient is improved, $\mu-v$ characteristic becomes small by 0.1 to 0.2 (see Table II), thus the change of friction coefficients immediately before and after the completion of engagement may be suppressed. This can contribute to alleviate shock when a speed change is effected in automatic transmission.

(2) As shown in FIG. 7, it has been confirmed that the change of kinetic friction coefficient with the passage of time is very small.

This means that the so-called "safety factor" may be set relatively low at the time of designing the friction engagement devices highly precisely. Namely, since the safety factor is determined on the assumption that the product is possessed of the required useful life and on the presumed amount of the wear and the possible change of friction coefficients with the passage of time, the fact that the changes of these parameters with the passage of time are small enables to set the safety factor much lower. Thus, the overall size of the friction engagement devices may be made compact and lightweight.

(3) Deformation due to heat was not observed.

Thus, it may be presumed that the occurrence of heat spots in the friction plates was prevented. This would contribute to the prevention of partial wear due to partial engagement, thereby increasing the useful life of the entire friction engagement devices.

Figure 6C:
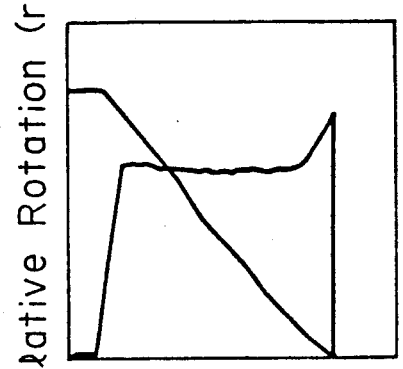

As to the mating plates with Cu plating:

As seen from FIG. 6c and Table II, the static friction coefficient $\mu_S$ has improved by 20 to 30% compared with the conventional mating plate (a).

Consequently, a larger torque may be transmitted if the engagement force is the same; and the slippage may be prevented at the time engagement has been completed. Speaking conversely, since the transmittable torque per unit area increases, it enables to reduce the engagement area or engagement time, or to reduce the number of the friction plates or mating plates required, thereby contributing to make the friction engagement devices compact as a whole.

What is claimed is:

1. In a friction engagement device including a friction plate comprising a core plate to which a friction material is bonded, and a metallic mating plate, said friction plate and said mating plate having faces arranged to engage each other and said faces being in contact with an oil, the improvement wherein the mating plate comprises a steel core having a plating consisting of at least 50% chromium.

2. A friction engagement device according to claim 1 in which the chromium plating on said steel core is applied by electroplating, electroless plating or dry plating.

3. In an automatic transmission comprising a friction engagement device including a friction plate comprising a core plate to which a friction material is bonded, and a metallic mating plate, said friction plate and said mating plate having faces arranged to engage each other in driving relationship and said faces being in contact with an automatic transmission fluid, the improvement wherein the mating plate comprises a steel core having a plating consisting of at least 50% chromium, whereby the change in the coefficient of friction of the device with time is suppressed, fluctuations in transmitted torque both before and after relative rotation of said plates is suppressed, and deformation of the plates due to heat is prevented.

4. An automatic transmission according to claim 3, in which the ratio of the friction coefficient at zero relative rotation ($\mu_0$) to the kinetic friction coefficient ($\mu_D$) at 1800 rpm is less by at least 0.1 than the corresponding ratio for a transmission having an unplated, steel mating plate but otherwise identical to said automatic transmission.

5. An automatic transmission according to claim 3, in which the ratio of the friction coefficient at zero relative rotation ($\mu_0$) to the kinetic friction coefficient ($\mu_D$) at 1800 rpm is less, by an amount between approximately 0.1 and 0.2, than the corresponding ratio for a transmission having an unplated, steel mating plate but otherwise identical to said automatic transmission.

6. An automatic transmission according to claim 3, in which the ratio of the friction coefficient at zero relative rotation ($\mu_0$) to the kinetic friction coefficient ($\mu_D$) at 1800 rpm is between approximately 0.88 and 0.78.

* * * * *